(12) United States Patent
Kilduff et al.

(10) Patent No.: US 10,544,989 B2
(45) Date of Patent: *Jan. 28, 2020

(54) ROTATIONAL SPINNING APPARATUS HAVING A PIVOTALLY-LEVERAGED DRIVE

(71) Applicant: Enrico Dalla Piazza, Bassersdorf (CH)

(72) Inventors: Edward H. Kilduff, Hermosa Beach, CA (US); Chi Ming Tse, Kwai Chung (HK); Gareth Brown, Brooklyn, NY (US); Chi Fai Cheung, Kwai Chung (HK)

(73) Assignee: Enrico Dalla Piazza, Bassersdorf (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,952

(22) Filed: May 17, 2019

(65) Prior Publication Data
US 2019/0271507 A1   Sep. 5, 2019

Related U.S. Application Data

(63) Continuation of application No. 14/156,360, filed on Jan. 15, 2014, which is a continuation of application
(Continued)

(51) Int. Cl.
*F26B 11/02* (2006.01)
*A47J 43/24* (2006.01)

(52) U.S. Cl.
CPC .............. *F26B 11/02* (2013.01); *A47J 43/24* (2013.01); *Y10T 74/18088* (2015.01); *Y10T 74/18128* (2015.01)

(58) Field of Classification Search
CPC ........................... F26B 11/02–10; A47J 43/24
(Continued)

(56) References Cited

U.S. PATENT DOCUMENTS

| 507,903 A | 10/1893 | Hancock |
|---|---|---|
| 1,194,318 A | 8/1916 | Power |

(Continued)

FOREIGN PATENT DOCUMENTS

| CH | 351731 | 3/1961 |
|---|---|---|
| CH | 353509 | 5/1961 |

(Continued)

*Primary Examiner* — Ibrahime A Abraham
*Assistant Examiner* — John J Norton
(74) *Attorney, Agent, or Firm* — Law Office of Thomas J. Brindisi

(57) ABSTRACT

A rotational spinning apparatus including an open container; a pivotally-leveraged drive with a manually-operable handle on its top and pivotable between down and extended positions and a rotating drive at its bottom and drivably connected to the handle; and a rotating member formed to sit rotatably within the container and drivably connect to the rotating drive. The rotating member defines an axis of rotation when in the container that runs centrally through the top and bottom of the container. When the pivotally-leveraged drive is placed over the container and the rotating drive is connected to the rotating member, the handle is pivotable along a plane substantially perpendicular to a plane perpendicular to the axis of rotation; and when so arranged and the handle is in the down position, both ends of the handle are intersected by a plane that is substantially perpendicular to the axis of rotation.

20 Claims, 8 Drawing Sheets

Related U.S. Application Data

No. 13/648,520, filed on Oct. 10, 2012, now Pat. No. 10,006,708, which is a continuation of application No. 12/069,374, filed on Feb. 7, 2008, now Pat. No. 9,885,518.

(60) Provisional application No. 60/900,367, filed on Feb. 7, 2007.

(58) Field of Classification Search
USPC .................................................. 99/495–513
See application file for complete search history.

(56) References Cited

U.S. PATENT DOCUMENTS

| | | | |
|---|---|---|---|
| 1,511,287 A | 10/1924 | Lindley | |
| 1,619,550 A | 3/1927 | Thebaud et al. | |
| 2,246,054 A | 6/1941 | Marty | |
| 2,347,383 A | 4/1944 | Wiegratz | |
| 2,407,819 A | 9/1946 | Dolan, 2nd | |
| 2,592,481 A | 4/1952 | Spencer et al. | |
| 2,796,987 A | 6/1957 | Meyer | |
| D183,384 S | 8/1958 | de Mille | |
| 3,123,114 A | 3/1964 | Andrews et al. | |
| 3,139,917 A | 7/1964 | Elmore | |
| 3,156,278 A | 11/1964 | Otto | |
| 3,581,790 A | 6/1971 | del Conte | |
| 3,729,096 A | 4/1973 | Fitzner et al. | |
| 3,885,321 A | 5/1975 | Foulneteau | |
| 3,990,358 A | 11/1976 | Cade | |
| 4,007,751 A | 2/1977 | Commiant | |
| 4,101,978 A | 7/1978 | Brackman | |
| 4,124,310 A | 11/1978 | Brackman et al. | |
| 4,209,916 A | 7/1980 | Doyel | |
| 4,264,215 A | 4/1981 | Nunlist et al. | |
| D260,346 S | 8/1981 | Lebowitz | |
| 4,374,574 A | 2/1983 | David | |
| 4,386,740 A | 6/1983 | Van Deursen | |
| 4,442,764 A | 4/1984 | Bos et al. | |
| 4,682,740 A | 7/1987 | Conigliaro et al. | |
| 4,763,567 A * | 8/1988 | Dalquist, III | A47J 36/165 366/247 |
| 4,768,429 A | 9/1988 | Federighi | |
| 4,905,465 A | 3/1990 | Jones et al. | |
| D315,657 S | 3/1991 | Ruttimann | |
| 5,064,535 A | 11/1991 | Hsu | |
| 5,082,190 A | 1/1992 | Chen | |
| 5,245,726 A | 9/1993 | Rote et al. | |
| 5,307,738 A | 5/1994 | Amstad | |
| 5,360,170 A | 11/1994 | Cartellone | |
| 5,401,159 A | 3/1995 | Hsu | |
| 5,435,237 A | 7/1995 | Huang | |
| 5,562,025 A | 10/1996 | Bull et al. | |
| 5,562,256 A | 10/1996 | Wolman et al. | |
| 5,617,783 A | 4/1997 | Beeler | |
| 5,735,193 A | 4/1998 | Chang | |
| 5,778,769 A | 7/1998 | Dodson | |
| 5,782,416 A | 7/1998 | Nejatbina | |
| D396,992 S | 8/1998 | Lallemand | |
| 5,823,672 A | 10/1998 | Barker | |
| 5,839,826 A | 11/1998 | Eubanks | |
| 5,842,651 A | 12/1998 | Smothers | |
| 5,865,109 A | 2/1999 | Bull | |
| 5,904,090 A | 5/1999 | Lillelund et al. | |
| 5,960,709 A | 10/1999 | Yip | |
| 5,996,483 A | 12/1999 | Yip | |
| 6,000,650 A | 12/1999 | Penaranda et al. | |
| 6,018,883 A | 2/2000 | Mulhauser | |
| 6,035,771 A | 3/2000 | Conran et al. | |
| D434,597 S | 12/2000 | Yip | |
| 6,510,785 B1 | 1/2003 | Margolin | |
| 6,622,618 B1 | 9/2003 | Glucksman et al. | |
| 6,877,684 B2 | 4/2005 | Wu | |
| 6,899,021 B2 | 5/2005 | Riede | |
| 7,422,169 B2 | 9/2008 | Mueller | |
| 7,681,495 B2 | 3/2010 | Wan et al. | |
| 9,885,518 B2 * | 2/2018 | Dalla Piazza | A47J 43/24 |
| 10,006,708 B2 * | 6/2018 | Kilduff | A47J 43/24 |
| 2006/0144257 A1 | 7/2006 | Cheng et al. | |
| 2006/0207441 A1 | 9/2006 | Mulhauser et al. | |
| 2007/0006742 A1 | 1/2007 | Paradise et al. | |
| 2007/0256315 A1 | 11/2007 | Wong | |
| 2008/0223226 A1 * | 9/2008 | Holcomb | A47J 42/04 99/495 |
| 2009/0090254 A1 | 4/2009 | Herren | |
| 2009/0114104 A1 * | 5/2009 | Sawhney | A47J 43/24 99/495 |
| 2014/0130364 A1 * | 5/2014 | Kilduff | A47J 43/24 34/58 |

FOREIGN PATENT DOCUMENTS

| | | |
|---|---|---|
| EP | 0176450 | 4/1986 |
| EP | 1400196 A2 | 3/2004 |
| FR | 743906 | 4/1933 |
| FR | 1012262 | 7/1952 |
| FR | 1259498 | 3/1961 |
| FR | 2642294 | 8/1990 |
| FR | 2713069 | 6/1995 |
| GB | 405485 | 2/1934 |
| GB | 2355946 A | 5/2001 |
| JP | 57-26670 | 6/1982 |
| JP | 62100989 | 5/1987 |
| JP | 02-046276 | 2/1990 |
| JP | 3022041 | 12/1995 |
| JP | 10-174647 | 6/1998 |
| WO | 02/085168 A1 | 10/2002 |
| WO | 2004073474 | 9/2004 |
| WO | 2005115209 | 12/2005 |
| WO | 2007128154 | 11/2007 |
| WO | 2007128155 | 11/2007 |

* cited by examiner

ROTATIONAL SPINNING APPARATUS HAVING A PIVOTALLY-LEVERAGED DRIVE

RELATED APPLICATIONS

This application is a continuation of co-pending application Ser. No. 14/156,360 filed Jan. 15, 2014, which is a continuation of application Ser. No. 13/648,520 filed Oct. 10, 2012 (now issued as U.S. Pat. No. 10,006,708), which in turn was a continuation of application Ser. No. 12/069,374 filed Feb. 7, 2008 (now issued as U.S. Pat. No. 9,885,518), and claims the benefit of U.S. provisional patent application Ser. No. 60/900,367 filed Feb. 7, 2007.

FIELD OF THE INVENTION

The present invention relates to a rotational spinning apparatus having a pivotally-leveraged drive.

BACKGROUND OF THE INVENTION

U.S. Pat. No. 5,865,109 to Bull and U.S. Pat. No. 5,904,090 to Lillelund et al. disclose manually-driven centrifugal drying devices that are hand-cranked by a handle that is integrated with the lid assembly and oriented for a direction of movement in a plane parallel with the lid assembly. U.S. Pat. No. 6,018,883 to Mulhauser discloses a manually-driven centrifugal drying device with a handle that is oriented for movement perpendicular to the lid assembly, but the mechanism does not provide leverage to attain rapid movement of the spinner. U.S. Patent Application Publication No. 2006/0144257 to Cheng et al. discloses a manually-driven centrifugal drying device with a pull-cord drive that generates leverage but is oriented for movement not perpendicular to the lid assembly.

SUMMARY OF THE INVENTION

A rotational spinning apparatus according to an embodiment of the invention comprises a container having a bottom and an open top; a pivotally-leveraged drive having a manually-operable pivoting handle on its top and a rotating drive at its bottom and drivably connected to the manually-operable pivoting handle, the manually-operable pivoting handle having two ends and movable between down and extended positions along a handle movement plane; and a rotating member formed to sit rotatably within the container and drivably connect to the rotating drive and spin on an axis of rotation running centrally through the top and bottom of the container. When the pivotally-leveraged drive is placed over the top of the container and the rotating drive is connected to the rotating member, the handle movement plane is substantially perpendicular to a plane that is perpendicular to the axis of rotation. In that same arrangement and with the manually-operable pivoting handle in the down position, both ends of the manually-operable pivoting handle are intersected by a plane that is substantially perpendicular to the axis of rotation.

BRIEF DESCRIPTION OF THE DRAWINGS

FIGS. 1-8B depict an embodiment of the present invention of a rotational spinning apparatus having a pivotally-leveraged drive for use with a bowl and basket nested within the bowl, wherein:

FIG. 1 is a top perspective view showing the handle locked down;

FIG. 2 is a top perspective view showing the handle partly extended upwardly;

FIG. 3 is a top perspective exploded view;

FIG. 4 is a bottom perspective partial cutaway view, particularly showing the braking mechanism;

FIG. 6 is a sectional side view, showing a bowl and a basket mated with the rotational spinning apparatus having a pivotally-leveraged drive;

FIG. 7 is a top perspective exploded view (from a different angle than FIG. 3) of the "drive-train;" and FIGS. 8A and 8B are top perspective close-up views of the gears, respectively showing the clutch cog in an engaged position and an unengaged position.

DETAILED DESCRIPTION OF A PREFERRED EMBODIMENT

Figure 6:
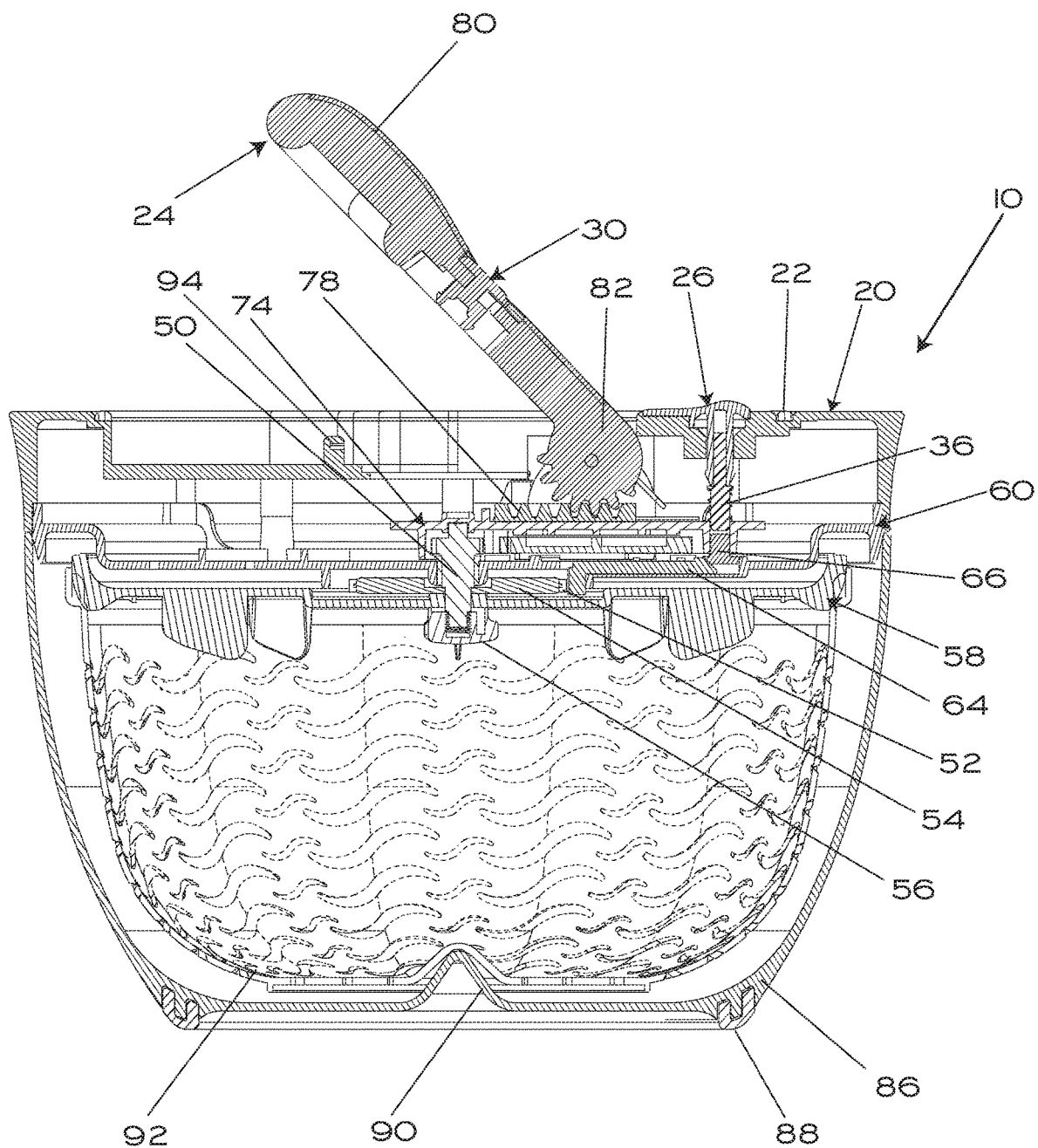

FIGS. 1-8b depict an embodiment of the present invention of a rotational spinning apparatus having a pivotally-leveraged drive 20 for use with a bowl 86 and basket 92 nested within the bowl so as to form a manually-driven centrifugal drying device 10. As shown in FIG. 6, the rotational spinning apparatus having a pivotally-leveraged drive 20 mates with a bowl 86 having solid walls and a conical protuberance 90 at its bottom, upon which the basket 92 (which is perforated and nests within the bowl 86) can spin during use. The bowl 86 may also include an annular high-friction footing 88 at its base. As manually-driven centrifugal drying devices generally including a spinning basket nested within a bowl are well-known, the present drawings and description are directed to the inventive rotational spinning apparatus having a pivotally-leveraged drive 20 that spins the basket 92.

Figure 1:
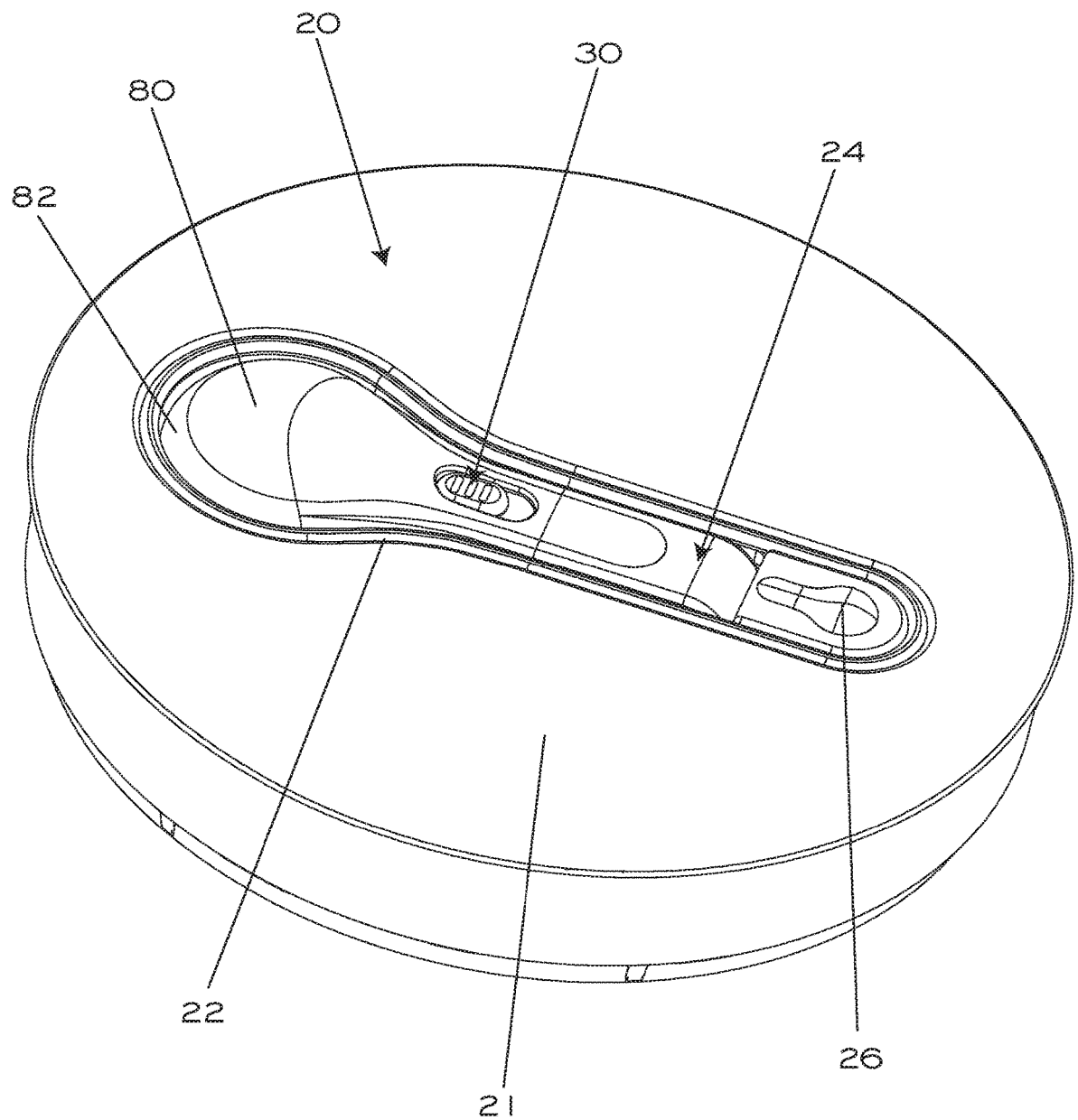
Figure 2:
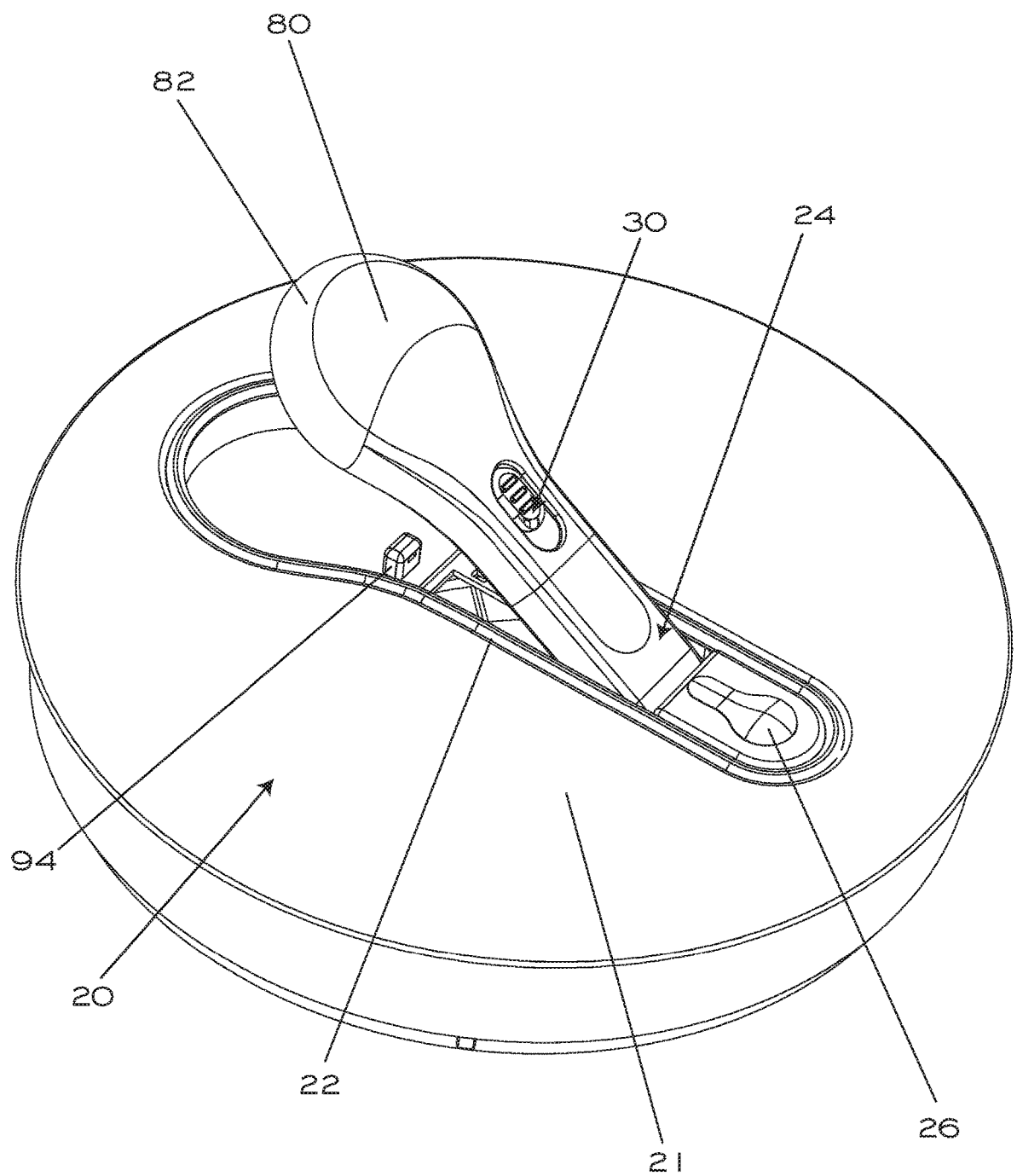
Figure 3:
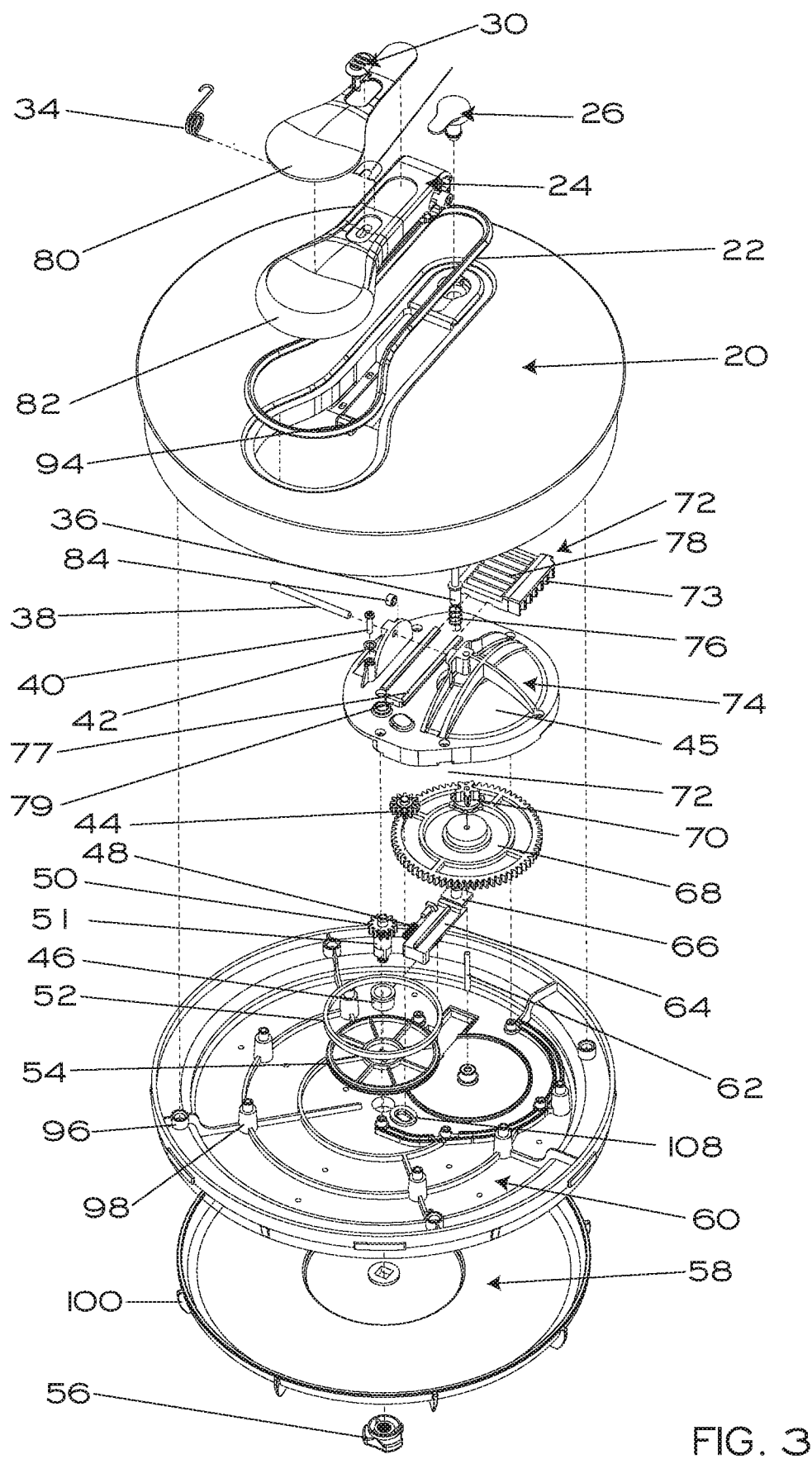
Figure 4:
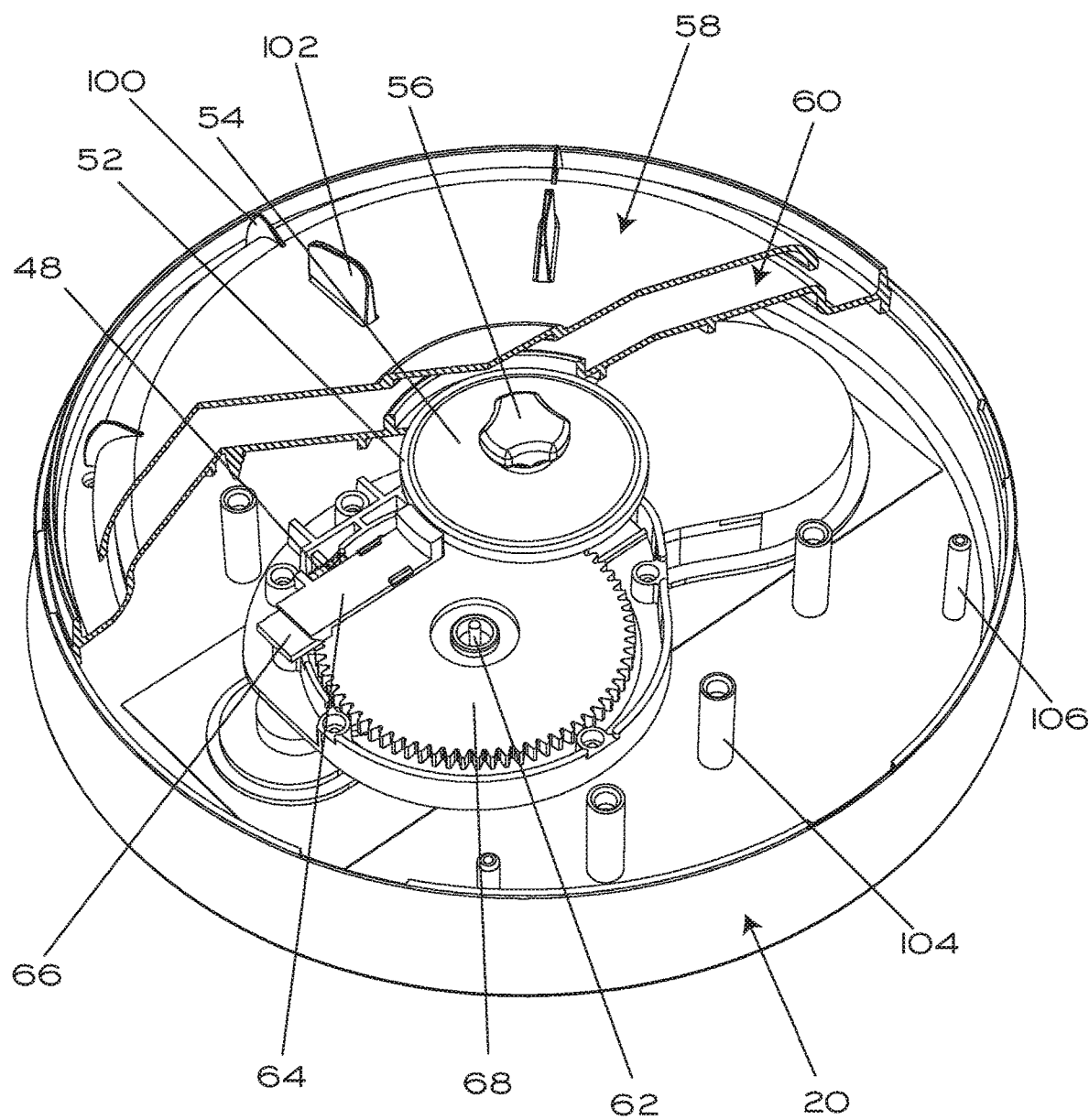
Figure 5A:
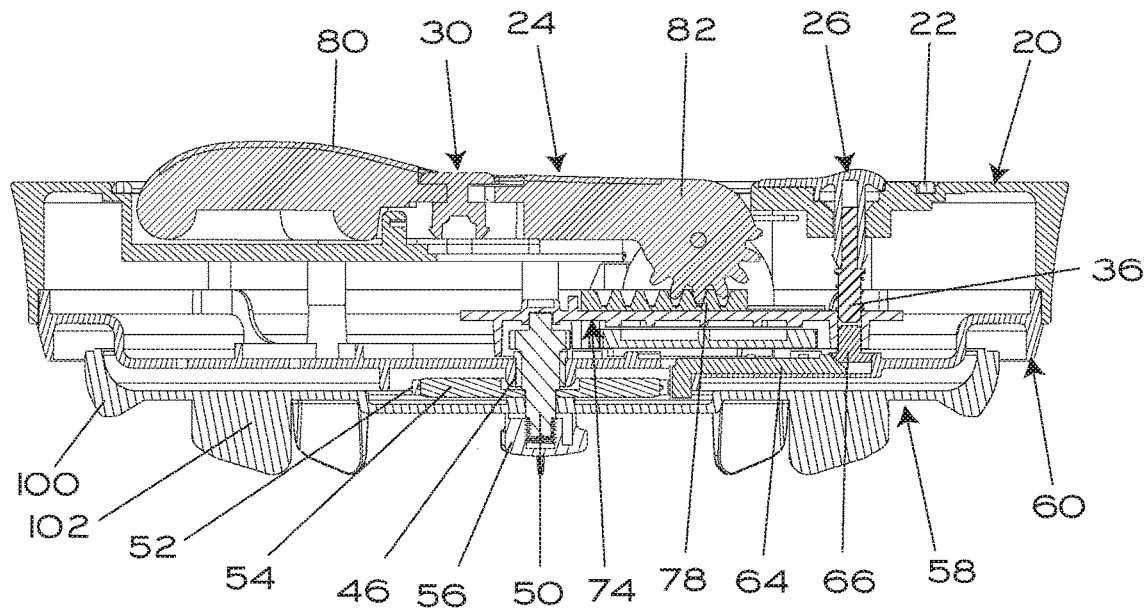
FIGS. 5A and 5B are sectional side views, respectively showing the handle in the locked-down position and in a partly-extended position.
Figure 5B:
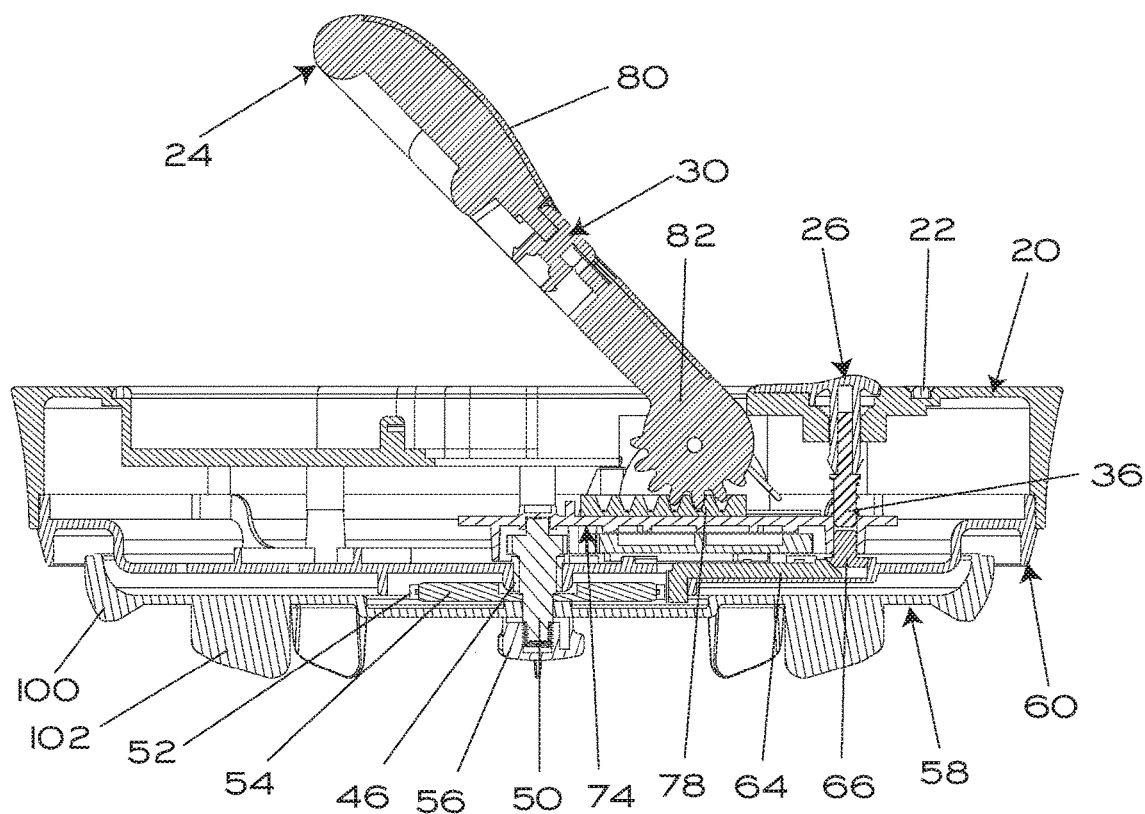
Figure 7:
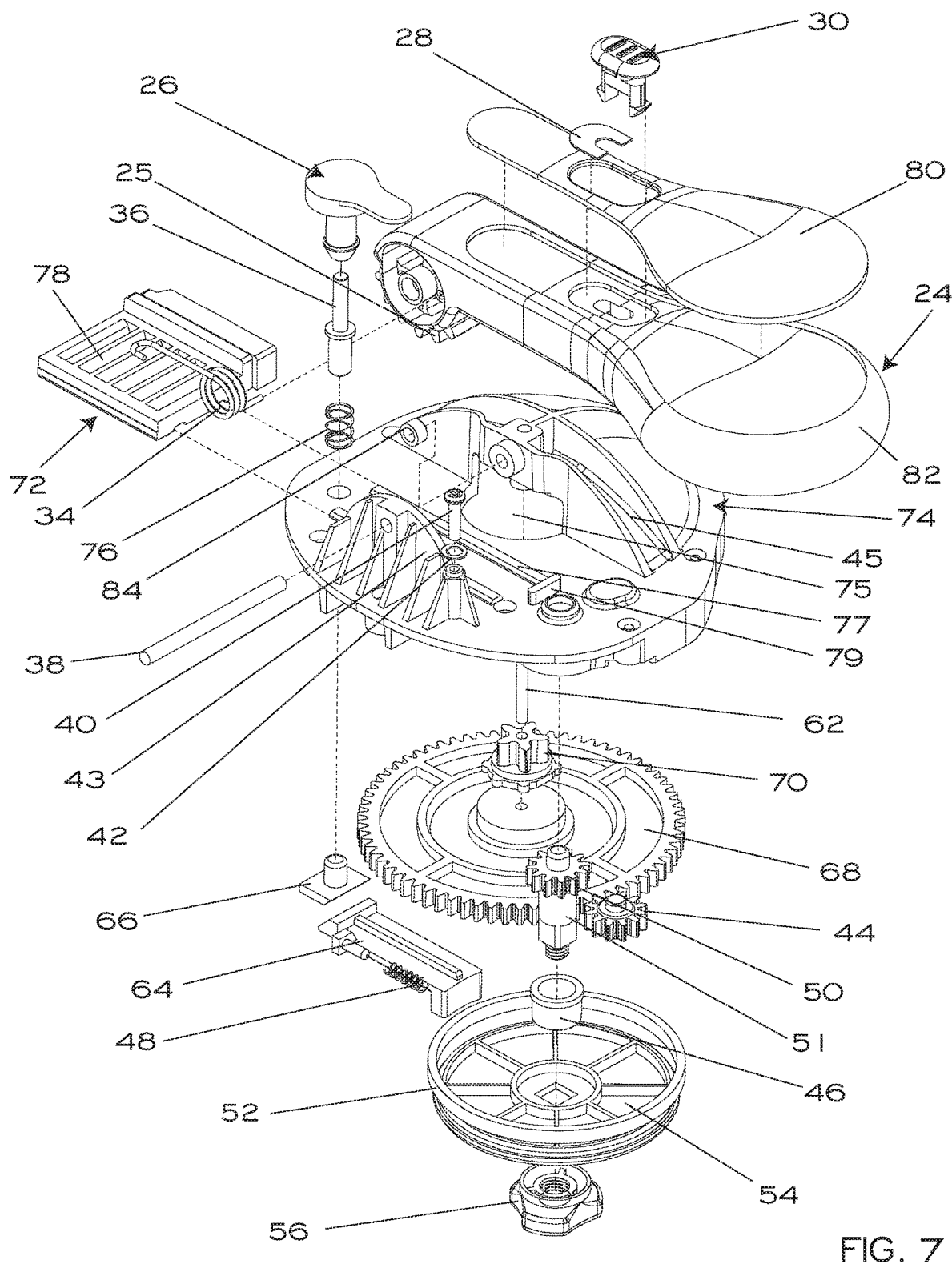

FIGS. 1 and 2 show a top perspective view of the rotational spinning apparatus having a pivotally-leveraged drive 20, which primarily consists of a generally flat housing 21 and a handle 24 pivotally attached to the rotational spinning apparatus having a pivotally-leveraged drive 20. A locking button 30 slides forward and backward on the handle 24 and includes a protruding pin (not shown) that inserts (when the handle 24 is in the down position as shown in FIG. 1 and the button 30 is moved forward) in a corresponding notch in the abutment 94, so as to lock the handle in the down position shown in FIG. 1. In the preferred embodiment, the handle can pivot further upwardly than shown in FIG. 2, such as to approximately a 90 degree angle with the housing 21. The rotational spinning apparatus having a pivotally-leveraged drive 20 also includes a brake button 26, further described below. As best seen in FIGS. 3 and 7, the handle 24 is biased toward the fully upwardly pivoted position by a spring 34. (The straight end of the spring 34 is engaged within a corresponding hole in the cylindrical opening in the end of the handle 24 while the longer, curved end is retained on a screw 40 along with a ring 42). The handle 24 pivots on a shaft 38 (which is affixed at each end within corresponding holes formed in stanchion 43 and dome 45, with a bushing 84 placed on the shaft 38 to bear the central portion of spring 34), and a spring 34 urges the handle 24 upwardly so that as soon as a user stops pushing the handle 24 downwardly towards the rotational spinning apparatus having a pivotally-leveraged drive 20, the handle 24 pivots upwardly back to an extended position. Rotation wheel 58 is driven uni-directionally by manual operation of the handle 24, and its fins 100 engage the basket 92 so that it rotates within the bowl 86. (Fins 102 are adapted to engage an optional, smaller-diameter "berry basket"—not shown—that can be nested within the basket 92).

Figure 8A:
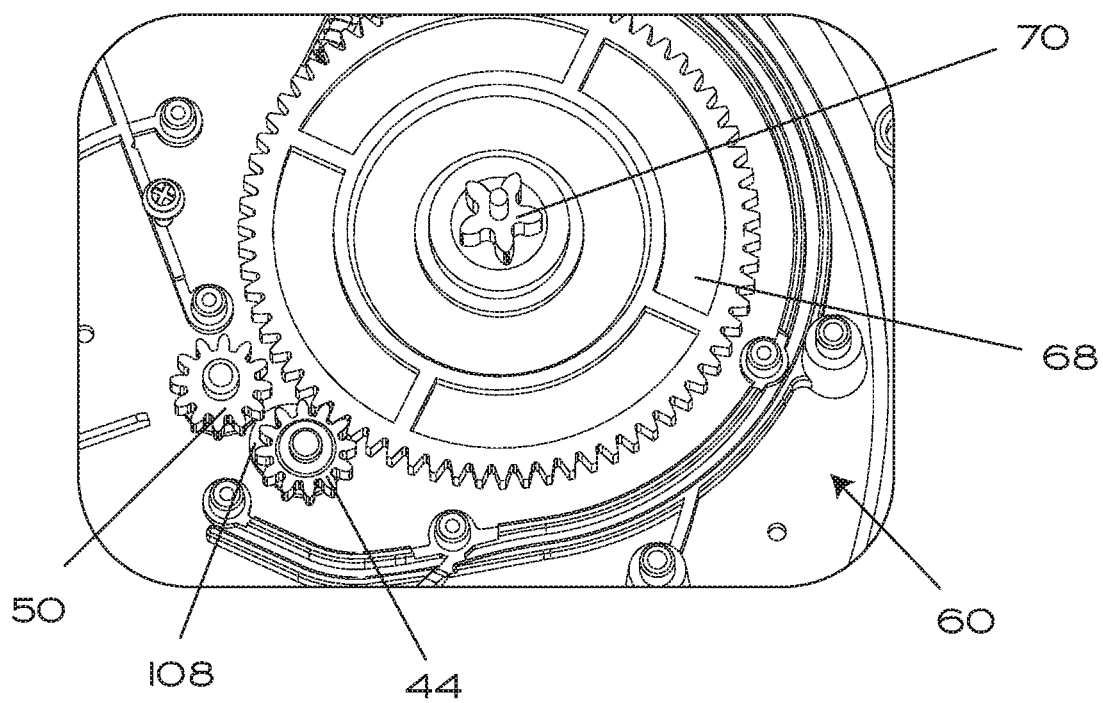
Figure 8B:
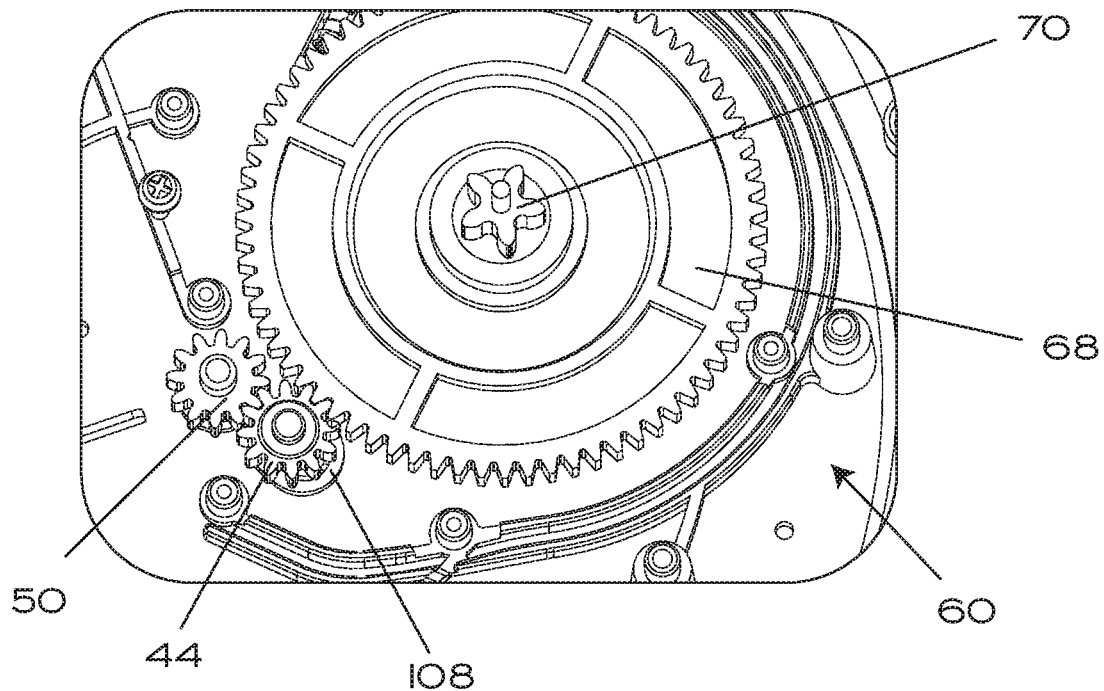

With particular reference to FIGS. 3-5B and 7, the transfer of force from manual operation of the handle 24 into the rotation wheel 58 is described. The teeth 25 at the pinion end 82 of the handle 24 (see FIGS. 5A and 5B), which are engaged with the teeth 78 of a rack 72, drive the rack 72 (which is free to slide on tracks 77 until hitting an abutment 79) in the direction away from axle 51 when the handle 24 is pushed downwardly toward the position shown in FIG. 5A. As seen in FIGS. 3 and 7, teeth 73 of the rack 72 engage (through aperture 75 in dome 45) pinion 70, which is fixedly attached to a drive wheel 68 and is stabilized on an axle 62 (which is received in a corresponding hole in the top interior of gear housing 74 such that the axle 62 can rotate within the hole). (Housing closure 60 is fixedly attached to housing 21 such as by locating pegs 106 in guide holes 96 and screws (not shown) in guides 98 and internally-threaded stanchions 104, and gear housing 74 is in turn fixedly attached to housing closure 60 such as by screws and stanchions). Thus downward and upward pivoting of the handle 24 produces forward and backward motion of the rack 72, producing resulting clockwise and counterclockwise rotation of the drive wheel 68. Clutch cog 44 clutches gear 50 only when drive wheel 68 is rotated clockwise as viewed in FIGS. 7-8B, however, because the ends of its axle are free to move within a slightly arcuate path 108 defined in housing closure 60 (and a corresponding slightly arcuate path defined in the opposing portion of the gear housing 74, the reverse outline of which is visible on the other side of gear housing 74 in FIGS. 3 and 7). Counterclockwise rotation of drive wheel 68 urges clutch cog 44 along slightly arcuate path 108 in the direction away from gear 50 and axle 51, and clockwise rotation urges it toward gear 50. As shown in FIG. 8B, when clutch cog 44 is clutching gear 50 (i.e., during clockwise rotation of the drive wheel 68 as viewed in FIGS. 7-8B), the "drive-train" shown in FIG. 7 is fully connected and produces leveraged revolution of gear 50 and rotation wheel 58 to which axle 51 is fixedly attached by endcap 56 (with a bushing 46 provided between the axle 51 and housing closure 60). As shown in FIG. 8A, when clutch cog 44 is not clutching gear 50 (i.e., during and after counterclockwise rotation of the drive wheel 68 as viewed in FIGS. 7-8B), the "drive-train" shown in FIG. 7 is not connected such that rotation wheel 58 (to which axle 51 is fixedly attached) is therefore free to spin irrespective of the motion of the rest of the drive-train and gears. Preferably for added stability (not shown), instead of a single drive gear 68, a symmetric, counter-rotating double-drive gear may be used, each having a pinion driven by teeth on opposing sides of a wider rack. One of ordinary skill also of course will recognize that a variety of other suitable mechanisms known in the art readily could be adapted as an alternative means of transferring the pivotal motion of the handle 24 into rotation of rotation wheel 58.

In a further optional feature, a brake means including a brake disk 54 can be employed to indirectly decelerate the rotation wheel 58. In the embodiment shown in the Figures, the brake disk 54 includes a high-friction tire 52 and is indirectly fixedly attached to the rotation wheel 58 (e.g., by endcap 56 screwed onto axle 51 or other suitable means such as a snap-lock). The tire 52 is slowed when the ram 64 impinges upon it. The ram 64 is biased against contact with the tire 52 by a spring 48, and is activated by manual pressure on the brake button 26. Manual pressure on the brake button 26 plunges a rod 36 downwardly against the bias of the spring 76, moving a wedge 66 downwardly. Downward movement of the wedge 66 forces the complementary wedge-shaped face on the ram 64 to drive the other end of the ram 64 into contact with the tire 52, slowing the disk 54, and thus the axle 51, and thus the rotation wheel 58.

It is noted that the majority of the parts of the described embodiment of a rotational spinning apparatus having a pivotally-leveraged drive preferably can be made of plastics that are suitably hard, strong, and durable, with only limited parts (such as the axle 62, gear 50, teeth 73, screws, springs, etc.) being optionally or preferably made of metals such as steel and/or zinc.

Although the present invention has been described in detail in the context of a preferred embodiment of a rotational spinning apparatus having a pivotally-leveraged drive for use with a nested basket and bowl so as to form a manually-driven centrifugal drying device, one skilled in the art will appreciate that numerous variations, modifications, and other applications are also within the scope of the present invention. Thus, the foregoing detailed description is not intended to limit the invention in any way, which is limited only by the following claims and their legal equivalents.

What is claimed is:

1. A rotational spinning apparatus comprising:
   a) a container having a bottom and an open top;
   b) a pivotally-leveraged drive defining a top and a bottom and having a manually-operable pivoting handle on its top and a rotating drive at its bottom and gears drivably connecting the rotating drive to the manually-operable pivoting handle, the manually-operable pivoting handle having two ends and movable between a down position and an extended position through a range of motion defining a handle movement plane; and
   c) a rotating member formed to sit rotatably within the container and drivably connect to the rotating drive, wherein an axis of rotation is defined by the rotating member when sitting in the container which runs centrally through the top and bottom of the container;
   wherein, when the pivotally-leveraged drive is placed over the top of the container and the rotating drive is connected to the rotating member, the handle movement plane is substantially perpendicular to a plane that is perpendicular to the axis of rotation; and
   wherein, when the pivotally-leveraged drive is placed over the top of the container and the rotating drive is connected to the rotating member and the manually-operable pivoting handle is in the down position, both ends of the manually-operable pivoting handle are intersected by a plane that is substantially perpendicular to the axis of rotation.

2. The apparatus of claim 1, wherein the gears include a rack.

3. The apparatus of claim 1, wherein the gears include one or more pinions.

4. The apparatus of claim 3, wherein the handle includes a pinion at one end.

5. The apparatus of claim 1, wherein the gears include a gear that is offset from the rotating member's axis of rotation.

6. The apparatus of claim 1, wherein the pivotally-leveraged drive includes a clutch.

7. The apparatus of claim 6, wherein the clutch is configured such that the rotating member is spun uni-directionally when the pivotally-leveraged drive is placed over the top of the container and the rotating drive is connected to the rotating member and the handle is manually pivoted between the extended and down positions.

8. The apparatus of claim 6, wherein the clutch includes a cog set in a path.

9. The apparatus of claim 1, wherein the rotating member is a basket and the pivotally-leveraged drive includes a rotation wheel adapted to engage the basket.

10. The apparatus of claim 1, wherein the manually-operable pivoting handle is biased toward the extended position.

11. A rotational spinning apparatus comprising:
a) a container having a bottom and an open top;
b) a pivotally-leveraged drive defining a top and a bottom and having a manually-operable pivoting handle on its top and a rotating drive at its bottom drivably connected to the manually-operable pivoting handle, the manually-operable pivoting handle having two ends and movable between a down position and an extended position through a range of motion defining a handle movement plane; and
c) a rotating member formed to sit rotatably within the container and drivably connect to the rotating drive, wherein an axis of rotation is defined by the rotating member when sitting in the container which runs centrally through the top and bottom of the container;
wherein, when the pivotally-leveraged drive is placed over the top of the container and the rotating drive is connected to the rotating member, the handle movement plane is substantially perpendicular to a plane that is perpendicular to the axis of rotation;
wherein, when the pivotally-leveraged drive is placed over the top of the container and the rotating drive is connected to the rotating member and the manually-operable pivoting handle is in the down position, both ends of the manually-operable pivoting handle are intersected by a plane that is substantially perpendicular to the axis of rotation; and
wherein the pivotally-leveraged drive includes a means for translating pivoting of the manually-operable pivoting handle into rotation in a plane perpendicular to the handle movement plane.

12. The apparatus of claim 11, wherein the pivotally-leveraged drive includes a rack.

13. The apparatus of claim 11, wherein the pivotally-leveraged drive includes one or more pinions.

14. The apparatus of claim 13, wherein the handle includes a pinion at one end.

15. The apparatus of claim 11, wherein the pivotally-leveraged drive includes a gear that is offset from the rotating member's axis of rotation.

16. The apparatus of claim 11, wherein the pivotally-leveraged drive includes a clutch.

17. The apparatus of claim 16, wherein the clutch is configured such that the rotating member is spun unidirectionally when the pivotally-leveraged drive is placed over the top of the container and the rotating drive is connected to the rotating member and the handle is manually pivoted between the extended and down positions.

18. The apparatus of claim 16, wherein the clutch includes a cog set in a path.

19. The apparatus of claim 11, wherein the pivotally-leveraged drive includes a rotation wheel.

20. The apparatus of claim 11, wherein the rotating member is a basket.

* * * * *